(12) United States Patent
Rhie et al.

(10) Patent No.: US 10,756,544 B2
(45) Date of Patent: Aug. 25, 2020

(54) ENERGY STORAGE SYSTEM AND MANAGEMENT METHOD THEREOF

(71) Applicant: DOOSAN HEAVY INDUSTRIES & CONSTRUCTION CO., LTD., Gyeongsangnam-do (KR)

(72) Inventors: Young Hoon Rhie, Gyeonggi-do (KR); Ju Young Youn, Gyeonggi-do (KR); Sung Ku Park, Gyeonggi-do (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 680 days.

(21) Appl. No.: 15/431,979

(22) Filed: Feb. 14, 2017

(65) Prior Publication Data

US 2017/0237260 A1    Aug. 17, 2017

(30) Foreign Application Priority Data

Feb. 15, 2016 (KR) .................. 10-2016-0017160

(51) Int. Cl.
*H02J 3/38* (2006.01)
*H02J 3/32* (2006.01)
(Continued)

(52) U.S. Cl.
CPC .............. *H02J 3/383* (2013.01); *H02J 3/32* (2013.01); *H02J 3/386* (2013.01); *H02J 3/387* (2013.01); *H02J 7/0068* (2013.01); *H02J 13/0006* (2013.01); *H02M 7/44* (2013.01); *Y02E 70/30* (2013.01)

(58) Field of Classification Search
CPC ...................................... H02J 3/383
See application file for complete search history.

(56) References Cited

U.S. PATENT DOCUMENTS

| 2014/0266061 A1* | 9/2014 | Wachal | H02J 7/0022 320/134 |
| 2015/0244209 A1* | 8/2015 | Suehiro | H02J 7/35 307/65 |
| 2017/0214246 A1* | 7/2017 | Wang | H02J 7/0018 |

FOREIGN PATENT DOCUMENTS

| DE | 102012105029 A1 | 12/2012 |
| EP | 2592740 A1 | 5/2013 |

(Continued)

OTHER PUBLICATIONS

Wikipedia contributors. (Sep. 13, 2019). Renewable energy. In Wikipedia, The Free Encyclopedia. Retrieved 22:48, Sep. 13, 2019, from https://en.wikipedia.org/w/index.php?title=Renewable energy &oldid=915518387 (Year: 2019).*

(Continued)

*Primary Examiner* — Daniel J Cavallari
(74) *Attorney, Agent, or Firm* — INVENSTONE Patent, LLC (57) ABSTRACT

An energy storage system includes one or more new and renewable energy power stations generating power with a new or renewable energy source, and an energy storage facility including a plurality of energy storage apparatuses to be charged by one of an external power grid supplying power to a power load and the one or more new and renewable energy power stations, and to be discharged to supply the power to the power load, wherein the plurality of energy storage apparatuses have different charging and/or discharging periods.

7 Claims, 8 Drawing Sheets

(51) Int. Cl.
H02J 7/00 (2006.01)
H02J 13/00 (2006.01)
H02M 7/44 (2006.01)

(56) References Cited

FOREIGN PATENT DOCUMENTS

| EP | 2884575 A2 | 6/2015 | |
|---|---|---|---|
| JP | 2013-153572 A | 8/2013 | |
| JP | 2014-131369 A | 7/2014 | |
| JP | 2016-001967 A | 1/2016 | |
| KR | 10-2013-0003409 A | 1/2013 | |
| WO | WO-2015061360 A1 * | 4/2015 | ............... H02J 3/12 |

OTHER PUBLICATIONS

Wikipedia contributors. "Electrical grid." Wikipedia, The Free Encyclopedia. Wikipedia, The Free Encyclopedia, Apr. 11, 2020. Web. Apr. 17, 2020 (Year: 2020).*
Patent Cooperation Treaty International Search Report dated Apr. 20, 2017 in corresponding international application PCT/KR2017/000631.
Korean Office Action dated Oct. 30, 2016 in corresponding Korean patent application 10-2016-0017160.
Yum, Seong Chan, "An analysis on the renewable energy-industry comparative for climate change response," Green Technology Center, 2014.
An extended European Search report issued by the European Patent Office on Apr. 12, 2017 in European Patent Application No. 17156283.8.

* cited by examiner

ENERGY STORAGE SYSTEM AND MANAGEMENT METHOD THEREOF

CROSS-REFERENCE TO RELATED APPLICATION

This application claims priority to Korean Patent Application No. 10-2016-0017160, filed on Feb. 15, 2016, the disclosure of which is incorporated herein by reference in its entirety.

BACKGROUND

Exemplary embodiments described herein relate to an energy storage system and a management method thereof, and more particularly, to an energy storage system having a combination of a plurality of electrochemical energy storage apparatuses having different characteristics, and a management method thereof.

New energy generally refers to energy generated by converting existing fossil fuels. Renewable energy generally refers to energy generated by converting sunlight, water, rainfall, biological organisms. Some specific forms of new energy includes, but are not limited to, fuel cells, hydrogen energy, etc. Some specific forms of renewable energy includes, but are not limited to, solar photovoltaic energy, solar thermal energy, bio-energy, wind power energy, hydro energy, etc.

An energy storage system (ESS) is a system storing new and renewable energy or residual energy of a grid in a chargeable and dischargeable battery, and supplying power to a load when needed. For example, an ESS may be a new and renewable energy power generation system represented by solar photovoltaic energy power generator connected to a power storage system. Korean Patent Laid-Open Publication No. 10-2013-0138611 discloses an energy storage system linked with a new and renewable energy power generation system.

Generally, an ESS is connected to a new and renewable energy source, an existing power grid, and an energy storage apparatus, which stores power from the new and renewable energy source or the existing grid. The ESS supplies power to a load from any one of the new and renewable energy source, the grid, and the energy storage apparatus when the load requires power. In the case where the load instantaneously increases during operation of the system, the energy storage apparatus is mainly used to compensate for an output power when the output becomes insufficient by configuring a super capacitor together with a battery.

However, a typical super capacitor has low energy density while a large capacity super capacitor is very expensive. Further, while the super capacitor is suitable in situations requiring a large output within a few seconds, such as for an elevator, etc., it is not suitable as a long term energy storage system for peak cut and peak shaving of power of a building, a factory, or the like.

SUMMARY

An object is to provide an energy storage system in which each energy storage apparatus may provide the most effective output while satisfying performance requirement by combining a plurality of electrochemical energy storage apparatuses having different characteristics, and a management method thereof. Other objects and advantages can be understood by the following description, and become apparent with reference to the described embodiments In accordance with one aspect, an energy storage system comprises one or more new and renewable energy power stations generating power with a new or renewable energy source, and an energy storage facility including a plurality of energy storage apparatuses to be charged by one of an external power grid supplying power to a power load and the one or more new and renewable energy power stations, and to be discharged to supply the power to the power load, wherein the plurality of energy storage apparatuses have different charging and/or discharging periods.

In accordance with another aspect, a method of managing an energy storage system, the energy storage system comprising one or more new and renewable energy power stations generating power with a new or renewable energy source, and an energy storage facility including a plurality of energy storage apparatuses, wherein the plurality of energy storage apparatuses have different charging and/or discharging periods, comprises the steps of charging a first energy storage apparatus with power generated from at least one of the one or more new and renewable energy power stations, and charging a second energy storage apparatus with power supplied by an external power grid.

BRIEF DESCRIPTION OF THE DRAWINGS

The above and other objects, features and advantages will be more clearly understood from the following detailed description taken in conjunction with the accompanying drawings, in which.

DETAILED DESCRIPTION

Hereinafter, an energy storage system according to an exemplary embodiment will be described in detail with reference to the accompanying drawings.

Figure 1:
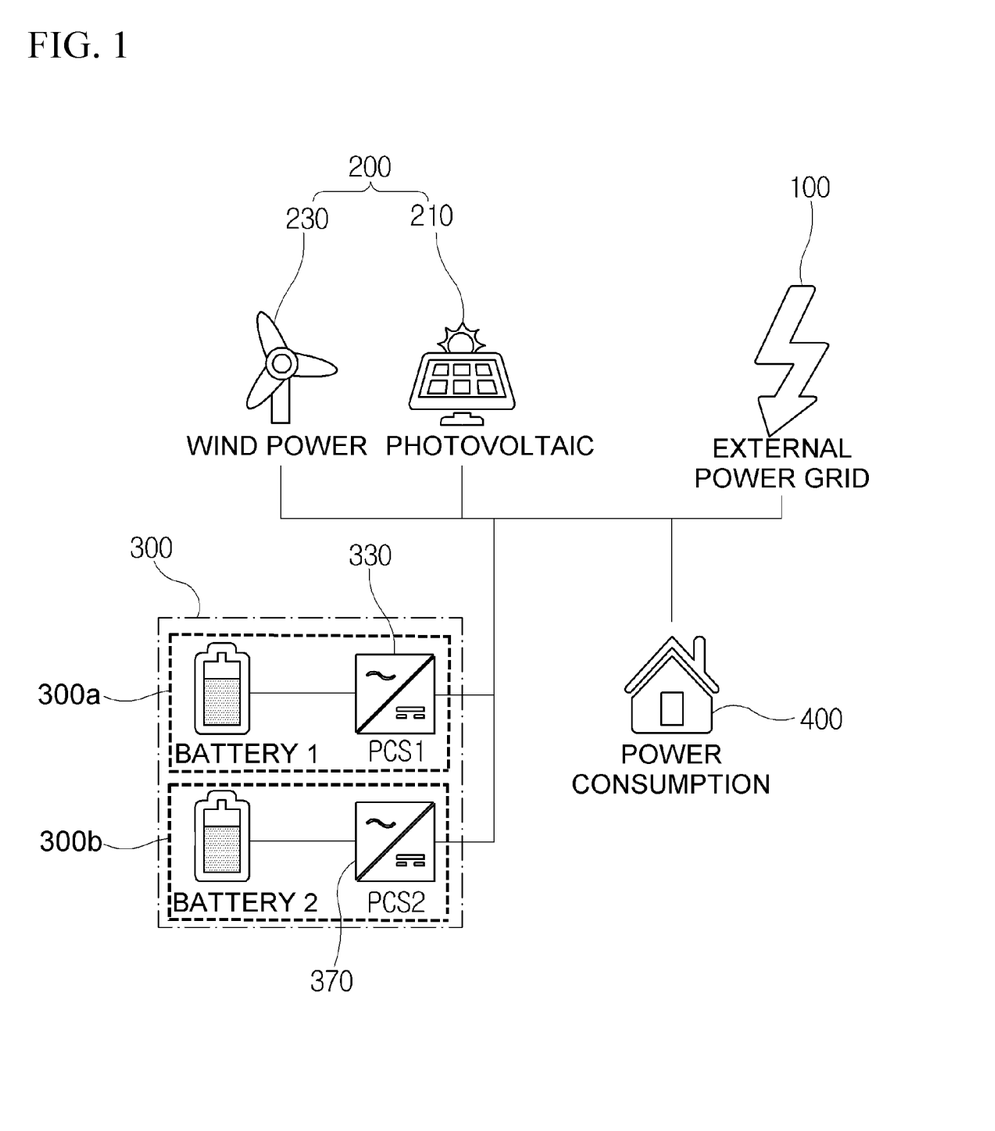
FIG. 1 is a diagram illustrating an energy storage system according to an exemplary embodiment.
Figure 2:
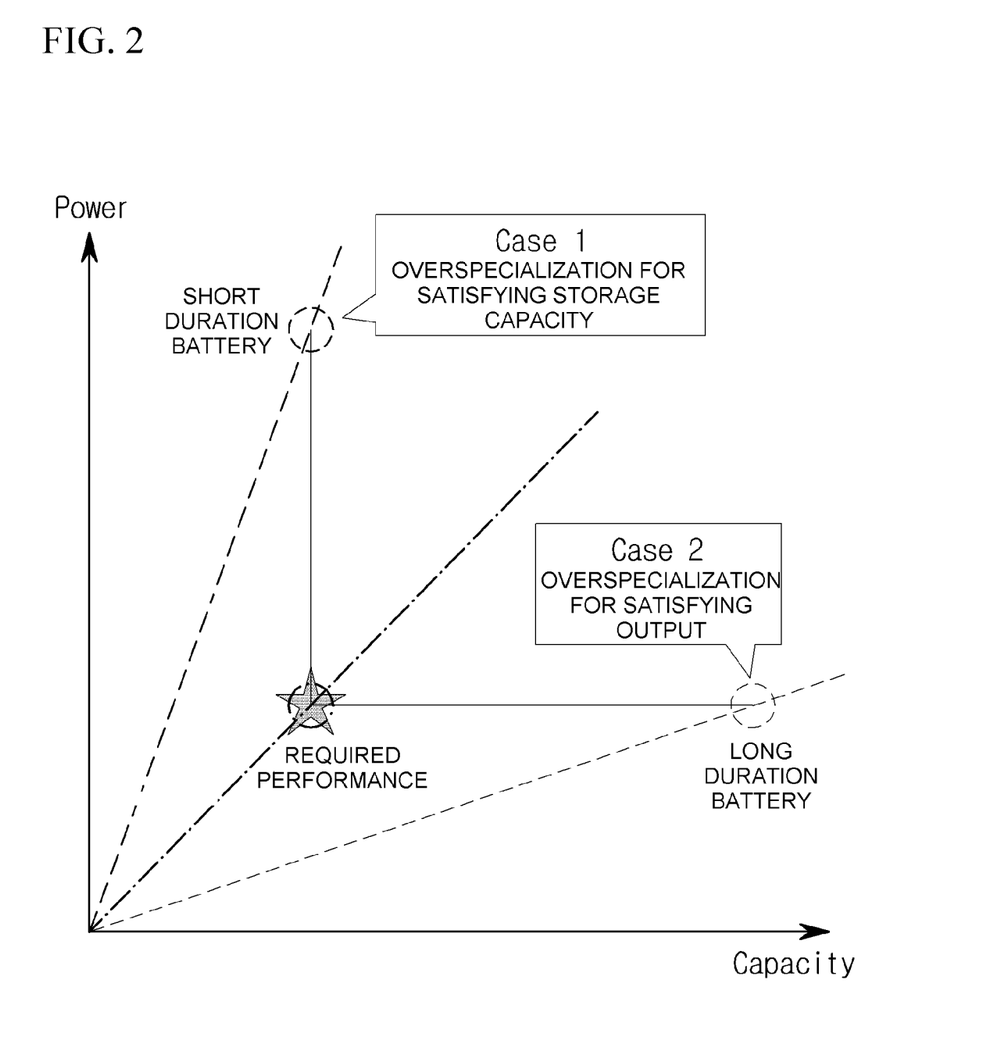
FIG. 2 is a graph illustrating an example of output in relation to capacity according to the energy storage system of FIG. 1.

FIG. 1 is a diagram illustrating an energy storage system according to an exemplary embodiment. FIG. 2 is a graph illustrating an example of output in relation to capacity according to the energy storage system of FIG. 1.

As illustrated in FIG. 1, the energy storage system according to an exemplary embodiment may include at least one new and renewable energy power station 200 and an energy storage facility 300. Power generated from the new and renewable energy power station 200 is supplied to the energy storage facility 300 or to a power load 400 together with power supplied from an external power grid 100.

The power grid 100 is a power grid supplying power generated by an existing power generation system, such as a thermal power generation system, a hydroelectric power generation system, a nuclear power generation system, etc., and a power load 400 may be various power consumption facilities, such as homes, buildings, factories, etc.

The new and renewable energy power station is a power station using new and renewable energy sources such as solar photovoltaic energy, wind power energy, tidal energy, biomass energy, etc., and different kinds of power stations may be utilized depending on the location of the installation. While at least one new and renewable energy power station may be utilized, the number of power stations to be utilized may be determined considering regional characteristics. For convenience of explanation, an exemplary case in which a photovoltaic power station 210 and a wind power station 230 are operated will be described by way of example herein.

The photovoltaic power station 210 may include a solar cell, a power converter converting electrical energy generated from the solar cell from DC to AC and connecting to a grid, a storage device temporarily storing the generated electrical energy, and the like. A configuration of the photovoltaic power station is a well-known technology, thus detailed description thereof will be omitted.

The wind power station 230 may include a blade, an energy converter converting kinetic energy of wind into electrical energy by the blade, a power transfer device, a controller, and the like, and also is a well-known technology. Thus, detailed description thereof will be omitted.

The energy storage facility 300 includes a plurality of chargeable and dischargeable energy storage apparatuses 300a and 300b. The energy storage facility 300 charges the energy storage apparatuses 300a and 300b to store energy, and discharges the energy storage apparatuses 300a and 300b according to a management method to supply the stored energy to the power grid 100 or to the power load 400. Generally, the energy storage facility 300 may include a battery management system (BMS) for managing charging or discharging of the energy storage apparatuses 300a and 300b and a power conditioning system (PCS) for supplying and managing power.

The energy storage apparatuses 300a and 300b may be configured with batteries or other charge storage devices having different output characteristics, prices, and charging periods. For convenience of explanation, an exemplary case in which a first battery 310 is a short duration battery and a second battery 350 is a long duration battery will be described by way of example. However, a plurality of batteries may be configured as the energy storage apparatus, and in such a case, the type of the battery may to be utilized may be determined in consideration of a charging period and output characteristics.

For purposes of explanation, a short duration battery generally refers to a battery having a charge capacity that is relatively smaller compared to a long duration battery. The short duration battery may be more rapidly charged and discharged as compared to the long duration battery, thus may easily cope with a case in which a rapid response for a load is required, such as sudden load change, intermittent power variation, or the like. The long duration battery has a larger capacity as compared to the short duration battery, thus is slowly charged and discharged. However, the long duration battery may cope with the load on a continuous basis and has long discharge time as compared to the short duration battery.

By adjusting a battery charge/discharge plan according to a type and characteristics of the battery, it is possible to efficiently manage the battery. Additionally, by obtaining residual capacity information of the battery, it is possible to establish a short-term power management scheme. Further, the battery 310, 350 functions as an energy storage storing energy supplied by the new and renewable energy power station 200 or the power grid 100, and as an energy source supplying the stored energy to the power load 400 or the power grid 100.

PCSs 330 and 370 are power converters and perform conversion between DC and AC and conversion of voltage, current, and frequency in to a form compatible with the power load 400 and/or power grid 100. The PCSs 330 and 370 supply energy supplied from a power plant (not shown) through the power grid 100 to the power load 400 or store the energy in the battery connected thereto, or supply energy supplied from the new and renewable energy power station 200 to the power load 400 or power grid 100, or store the energy in the battery connected thereto. Alternatively, power management is performed by discharging the battery to supply the stored energy to the power load 400 or the power grid 100. In this case, the charge/discharge of the battery is managed in consideration of type and characteristic information of the battery. Further, the PCSs 330 and 370 may monitor the power consumed by the power load 400 to store and hold the monitored result as log information.

The BMS (not shown), which is a battery management system, controls a charge/discharge amount of the battery to an appropriate level by sensing a voltage, a current, a temperature, etc. of the battery, performs cell balancing of the battery, and checks the residual capacity of the battery. Further, the BMS protects the battery through emergency operation when a risk is detected. Further, the BMS stores type and characteristic information of the battery and manages charge and discharge according to the characteristics of the battery. For convenience of explanation, the BMS is not separately illustrated in the drawings as it may reside in the energy storage facility 300, in one or more of the energy storage apparatuses 300a and 300b, or in a system external to the energy storage facility 300 without departing from the scope of the present disclosure.

As illustrated in FIG. 2, in an exemplary case in which only the short duration battery or a super capacitor is provided, when a storage capacity required in the system (i.e., a point of "Required Performance" in FIG. 2) is increased, overspecialization may occur. Further, in a case in which only the long duration battery is provided, it is difficult to cope with sudden load change and overspecialization may occur in order to satisfy instantaneous output required in the system. However, when the short duration battery and the long duration battery are utilized in combination, it is possible to satisfy the storage capacity and output required by the system without overspecialization of the respective batteries.

For example, as illustrated in FIG. 2, the first battery 310 may be a lithium ion battery (LiB) which is a short duration battery, and the second battery 350 may be a sodium ion battery (NiB) which is a long duration battery. An exemplary case in which the first battery 310 costs 450 dollars per kWh at charge-rate (C-rate, output of 0.5 W per 1 Wh), and the second battery 350 costs 300 dollars per kWh at C-rate (output of 0.05 W per 1 Wh) will be described by way of example.

In this case, in a case of changing an output combination ratio while having the same performance, when a capacity ratio of the first battery 310 is 44.4% and a capacity ratio of the second battery 350 is 55.6%, it is possible to save costs by about 18.5% while satisfying the required performance as compared to a case in which only the lithium ion battery 310 is provided. That is, through the combination of the short duration battery 310 and the long duration battery 350, it is possible to optimize both of price and performance.

Meanwhile, in addition to the case in which power is supplied to the power load 400 that is not greatly changed in a normal situation (hereinafter, referred to as base load), a temporary load requiring instantaneous high output (hereinafter, referred to as peak load) may occur. Typically, the peak load is generally handled by using a super capacitor. However, a super capacitor has disadvantages in that although it is capable of high output, it is expensive and not suitable for an energy storage system performing peak cut operation or peak shaving operation. In order to compensate for the disadvantages, an exemplary embodiment utilizes a plurality of batteries having different charging periods as the energy storage apparatuses, thereby coping with the peak load.

Peak cut operation is an operation scheme involving temporarily and partially blocking the load so as not to exceed the target power when the load concentrated in a specific time period may not be dispersed to another time period. Peak shaving operation, also referred to as peak load reduction or peak load management, is an operation scheme of storing idle power for a time period in which the highest load occurs and using the stored power in the peak time period.

In a case in which the first battery 310 and the second battery 350 are configured as the same as the above described example, the first battery 310 is the short duration battery having a short charging period, thus copes with the peak load of which the load change is dramatic. The second battery is the long duration battery having a long charging period, thus copes with the base load with little load change.

In the energy storage system according to the present disclosure having the above-described configuration, an exemplary management method of the energy storage apparatus will be described. For purposes of explanation, the exemplary management control of the energy storage apparatus is performed by the PCS).

As described above, the case in which the first battery 310 is a lithium ion battery, which is a short duration battery, and the second battery 330 is a sodium ion battery, which is a long duration battery, will be described by way of example, and specifically, a case in which 250 kW/1 MWh energy storage apparatus 300 is configured will be described by way of example.

Figure 3:
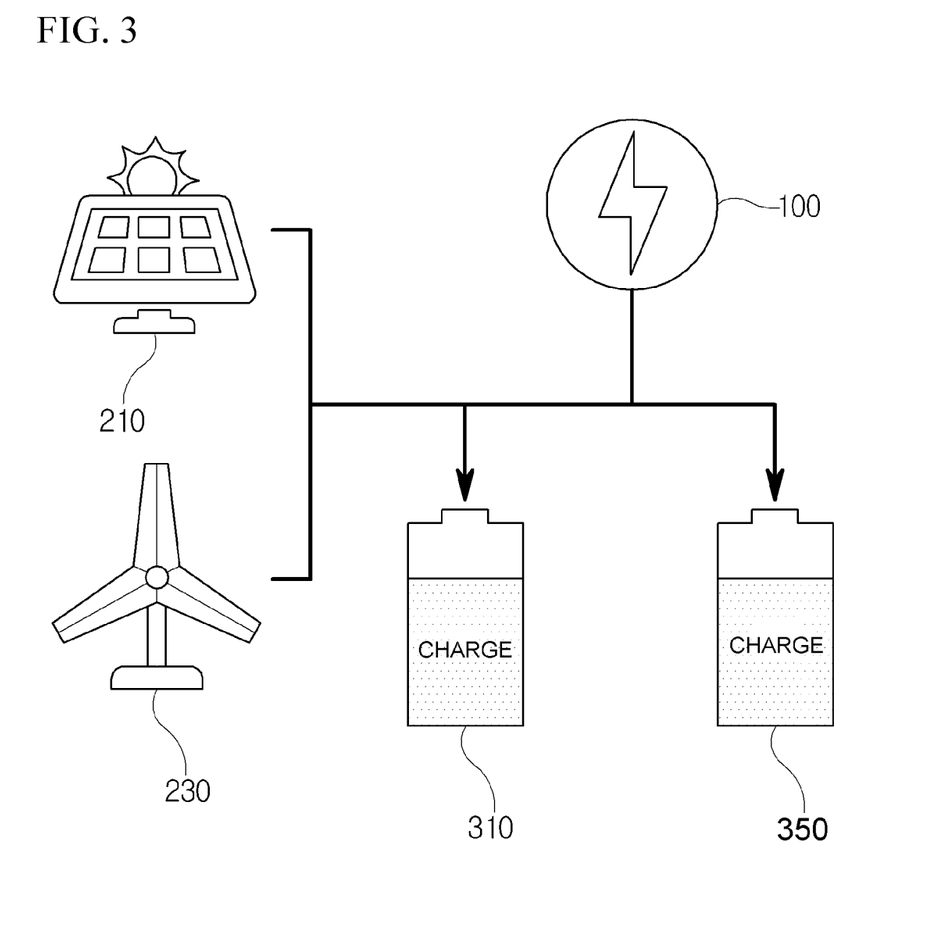
FIG. 3 is a diagram illustrating an exemplary power flow during charging according to the energy storage system of FIG. 1.
Figure 4:
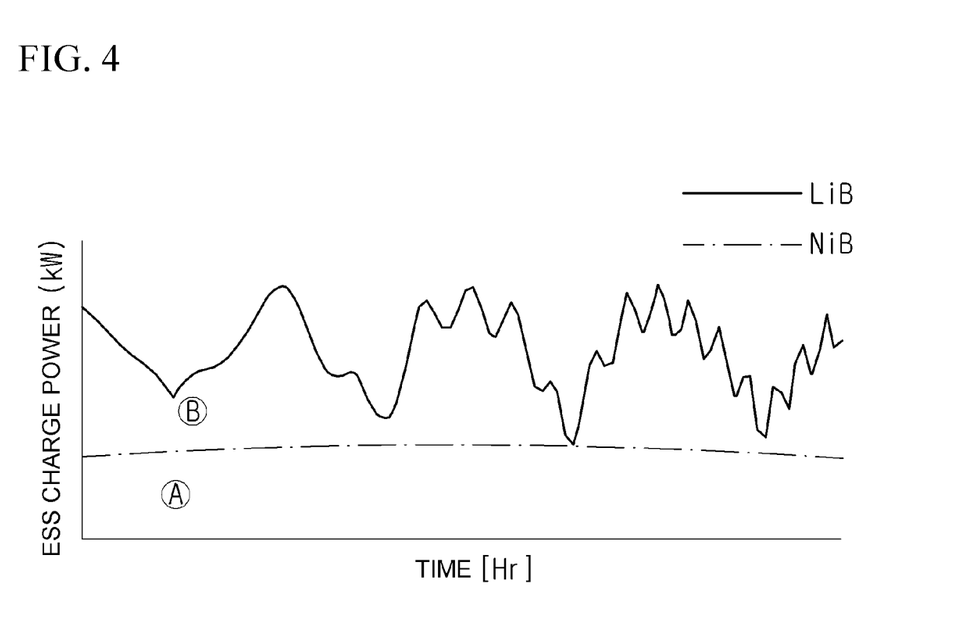
FIG. 4 is a graph illustrating an exemplary power curve during charging according to FIG. 3.
Figure 5:
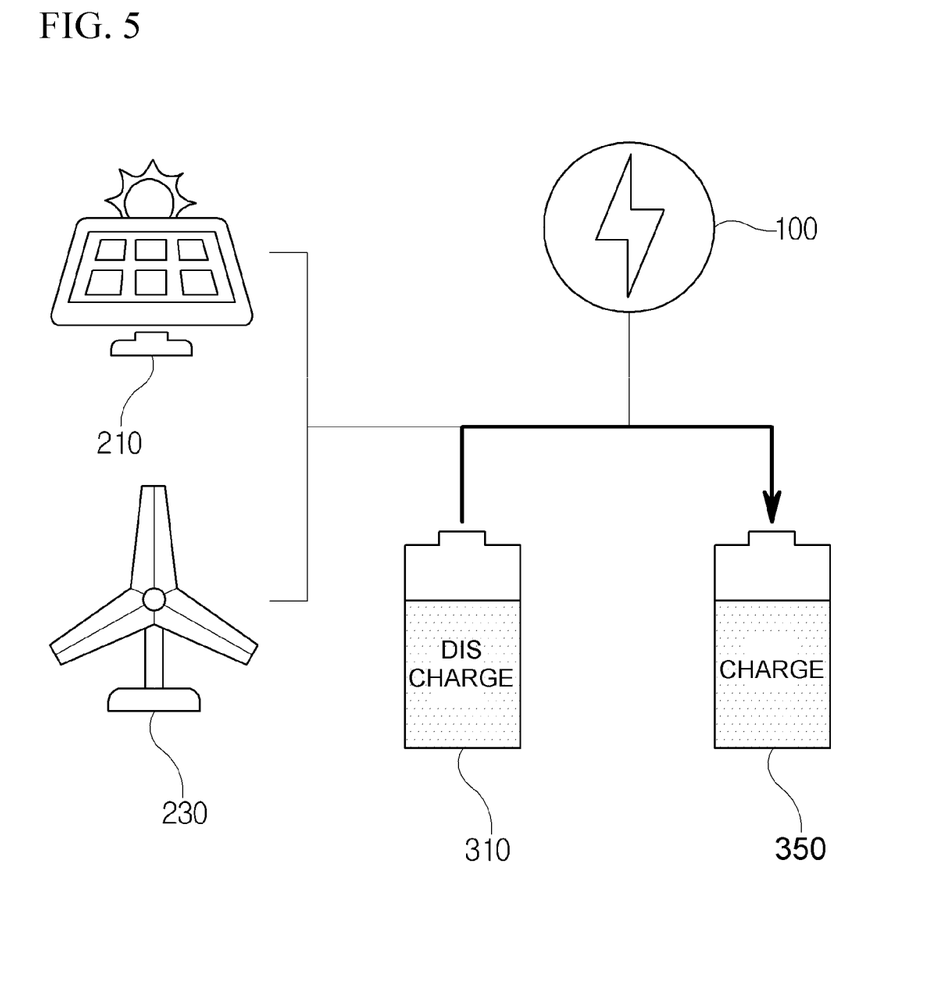
FIG. 5 is a diagram illustrating an exemplary power flow when balancing energy storage apparatuses during an idle time according to FIG. 3.

FIG. 3 is a diagram illustrating an exemplary power flow during charging according to the energy storage system of FIG. 1. FIG. 4 is a graph illustrating an exemplary power curve during charging according to FIG. 3. FIG. 5 is a diagram illustrating an exemplary power flow when balancing energy storage apparatuses during an idle time according to FIG. 3.

As illustrated in FIG. 3, the first battery 310 and the second battery 350 are charged by receiving power from the new and renewable energy power station 200 such as the photovoltaic power station 210 and the wind power station 230, or the power grid 100. Alternatively, the first battery 310 and the second battery 350 may be charged by receiving power from both of the new and renewable energy power station 200 and the power grid 100.

At this point, as illustrated in FIG. 4, since the second battery (NiB) 350 is the long duration battery, a charging rate thereof is slow, thus it may be continuously charged with as little load change as possible (see region A in FIG. 4). For purposes of example, the second battery 350 may receive power from the power grid 100. The power generated from the new and renewable energy power station 200 may intermittently change depending on weather conditions, thus the power generated from the new and renewable energy power station 200 may be used to charge in the first battery (LiB) 310 (see region B in FIG. 4).

If a value obtained by subtracting a charge amount of the second battery 350 from a charge amount of the first battery 310 is a set value or more (i.e., if the charge in the first battery 310 compared to the charge in the second battery 350 is more than or equal to a set threshold), the second battery 350 may be charged by receiving power from the first battery 310 that is rapidly charged due to the short changing period during the idle time, as illustrated in FIG. 5. By this method, it is possible to balance the charge amounts of the first battery 310 and the second battery 350. However, when quick charge is needed, it is possible to charge the second battery 350 at a higher C-rate (charge rate) by increasing the output of the first battery 310 (see region E in FIG. 7). When it is difficult to balance the charge amounts by charging the second battery 350 with the output of the first battery 310, if the power load demand may be met, the second battery 350 may also be charged by receiving some of the power from the power grid 100 as needed.

Figure 6:
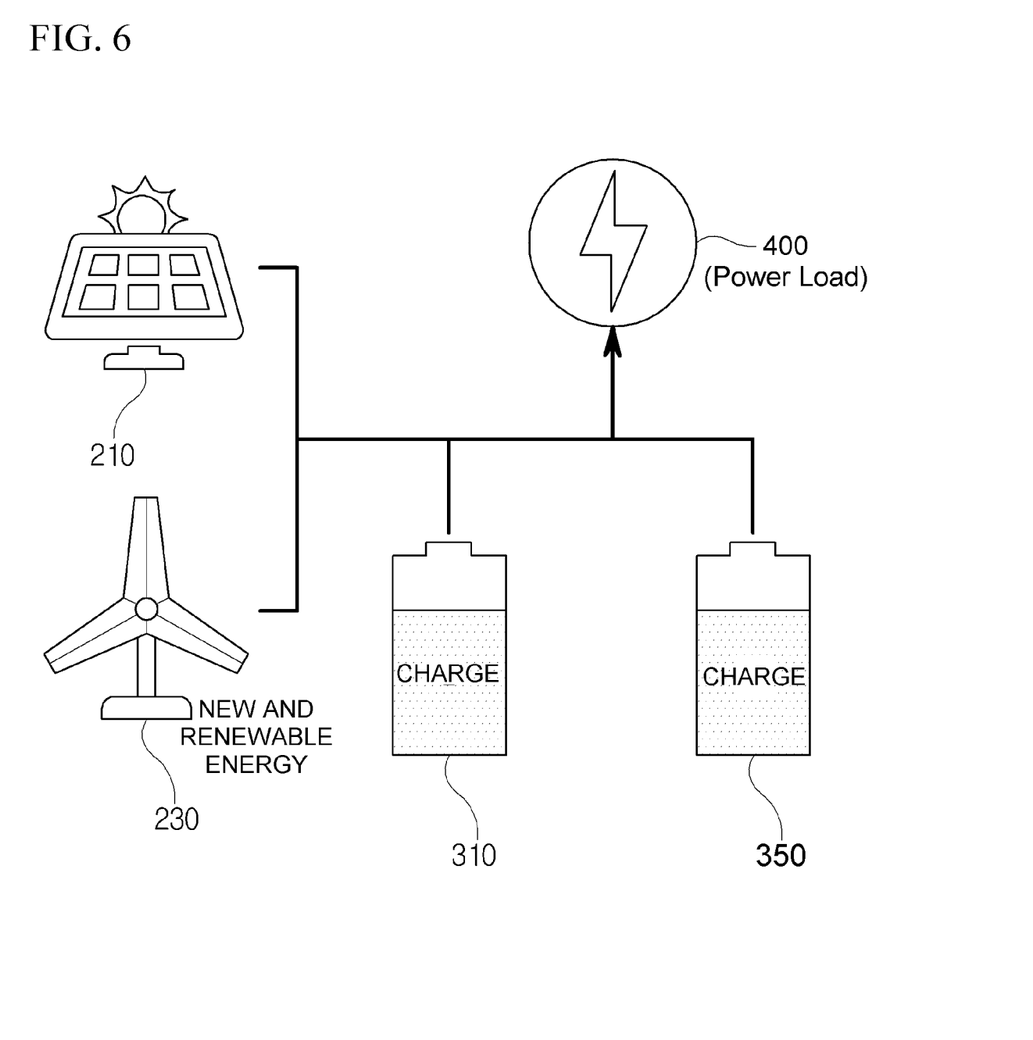
FIG. 6 is a diagram illustrating an exemplary power flow during discharging according to the energy storage system of FIG. 1.
Figure 7:
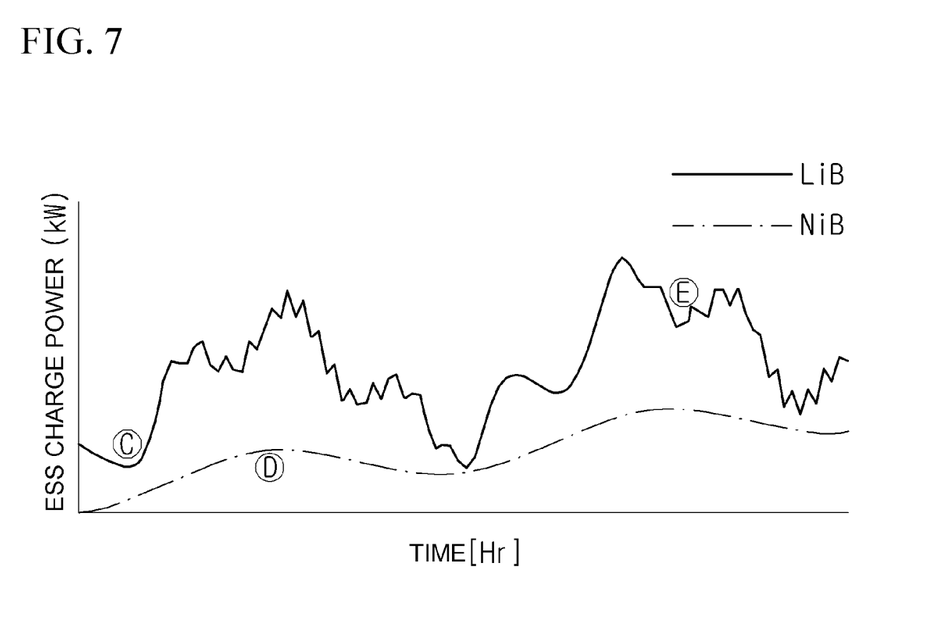
FIG. 7 is a graph illustrating an exemplary power curve during discharging according to FIG. 6.
Figure 8:
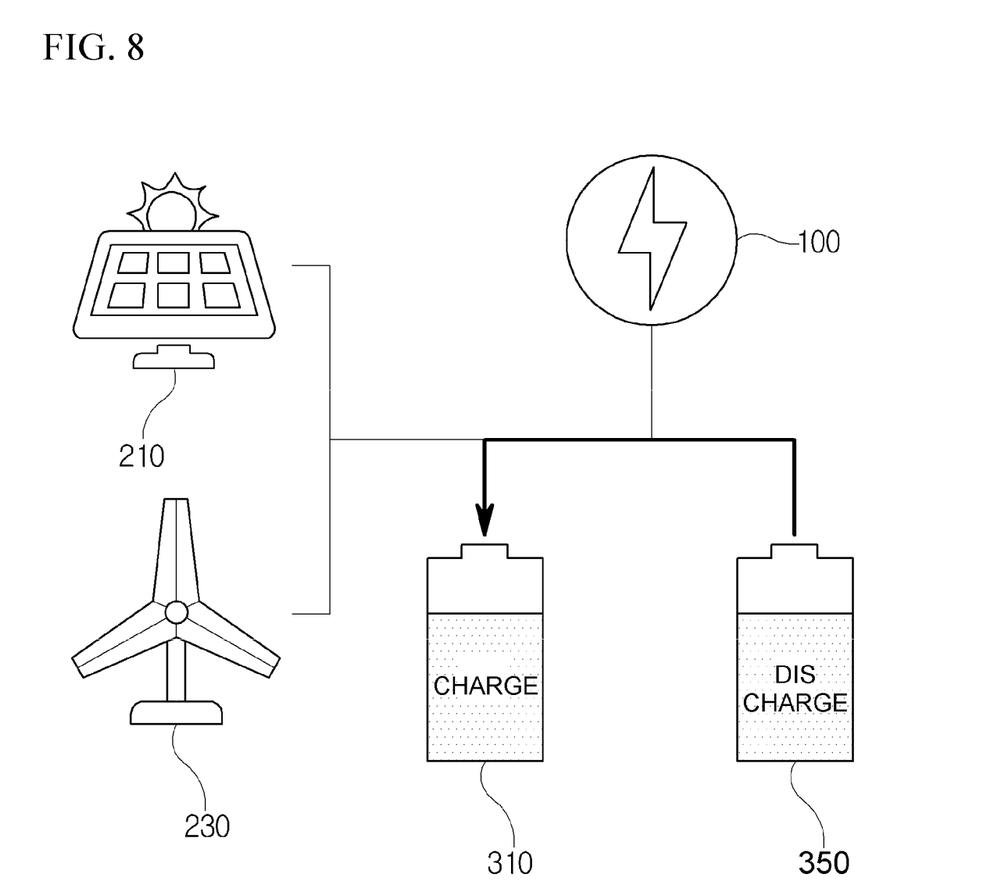
FIG. 8 is a diagram illustrating an exemplary power flow when balancing energy storage apparatuses during an idle time according to FIG. 6.

FIG. 6 is a diagram illustrating an exemplary power flow during discharging according to the energy storage system of FIG. 1. FIG. 7 is a graph illustrating an exemplary power curve during discharging according to FIG. 6. FIG. 8 is a diagram illustrating an exemplary power flow when balancing energy storage apparatuses during an idle time according to FIG. 6.

When supplying power to the power load 400 as illustrated in FIG. 6, first, the first battery (LiB) 310 capable of performing rapid response to the load copes with the load (see region C in FIG. 7). The second battery (NiB) 350 copes with the base load, and is continuously discharged with as little load change as possible (see region D in FIG. 7). The first battery 310 performs the response to the changing power peak (see region E in FIG. 7), and it is possible to flexibly cope with the peak power demand by discharging the second battery 350 with higher output as compared to a normal situation if needed.

When the energy stored is discharged, if a value obtained by subtracting a charge amount of the first battery 310 from a charge amount of the second battery 350 is a set value or more (i.e., if the charge in the second battery 350 compared to the charge in the first battery 310 is more than or equal to a set threshold), the first battery 310 may be charged by receiving power from the second battery 350 during the idle time, as illustrated in FIG. 8. By this method, it is possible to balance the charge amounts of the first battery 310 and the second battery 350.

As described above, the energy storage facility may utilize different combinations of the short duration battery and the long duration battery, and may be used with various exemplary combinations as below.

TABLE 1

| Short duration battery | Long duration battery |
| --- | --- |
| LiB (lithium ion battery) | NiB (sodium ion battery) |
| LiB | VRFB (vanadium redox flow battery) |
| LiB | LAB (lead acid battery) |
| LAB | NiB |

TABLE 1-continued

| Short duration battery | Long duration battery |
|---|---|
| LAB | VRFB |
| VRFB | NiB |
| Super Capacitor | LiB |

Types of the short duration battery and the long duration battery are not designated. That is, a battery with relatively higher C-rate and rapid response speed as compared to the other one may be used as the short duration battery depending on the type and characteristics of the combined batteries. Accordingly, various types of batteries may be combined and used in addition to the types exemplarily described in the above Table. When three or more batteries are used, the energy storage apparatus may also be configured using an ultra-short duration battery, the short duration battery, and the long duration battery depending on the relative characteristics of the battery.

In the exemplary embodiments described above, although the case in which batteries instead of a super capacitor are provided has been described by way of example, a super capacitor may be used instead of the short duration battery and the long duration batteries may be used in combination depending on the system configuration condition such as purpose of use, economical efficiency, etc.

The energy storage system and the management method thereof according to various exemplary embodiments may provide optimal performance required in the system by combining a plurality of batteries having different charging periods, output characteristics, or the like as a way for substituting the expensive super capacitor. Further, since the respective batteries are driven with the most effective output, efficiency of the energy storage system is improved and it is suitable for peak cut operation, peak shaving operation, etc.

The embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. An energy storage system, comprising:
a power station generating power using a non-renewable energy source or a renewable energy source;
an external power grid coupled to supply power to a power load; and
an energy storage facility including a battery management system (BMS) and a plurality of energy storage apparatuses controlled by the BMS, the BMS configured to individually charge the plurality of energy storage apparatuses by at least one of the power station and the external power grid and configured to individually discharge the plurality of energy storage apparatuses to supply power to the power load,
wherein the plurality of energy storage apparatuses include
a first energy storage apparatus comprising a first battery of a first battery type having first charge and discharge times according to the first battery type, and
a second energy storage apparatus comprising a second battery of a second battery type different from the first battery type having second charge and discharge times according to the second battery type, the second charge and discharge times being longer than the first charge and discharge times, respectively.

2. The energy storage system of claim 1, wherein the BMS controls the first energy storage apparatus to cope with a peak load and controls the second energy storage apparatus to cope with a base load.

3. The energy storage system of claim 1, wherein the plurality of energy storage apparatuses further include a third energy storage apparatus comprising a third battery having third charge and discharge times according to the specific value of the power load, the third charge and discharge times being shorter than the first charge and discharge times, respectively.

4. The energy storage system of claim 1, wherein the BMS is configured to store type and characteristic information of the plurality of energy storage apparatuses and to control a charge amount and a discharge amount of the plurality of energy storage apparatuses according to the stored type and characteristic information.

5. The energy storage system of claim 1, wherein each of the plurality of energy storage apparatuses includes a power conditioning system (PCS) to manage power of the energy storage apparatus, the PCSs configured
to supply a specific energy storage apparatus of the plurality of energy storage apparatuses with power generated by the external power grid or the power station or to supply energy of the specific energy storage apparatus to another one of the plurality of energy storage apparatuses,
to perform conversion between DC and AC of power,
to monitor power consumed by the power load, and
to store monitored results as log information.

6. The energy storage system of claim 5, wherein the BMS controls the plurality of energy storage apparatuses to perform a peak cut operation or a peak shaving operation according to a time period of a peak load based on the stored log information.

7. The energy storage system of claim 1, wherein the power station consists of a plurality of power stations including at least one power station generating power using a non-renewable energy source and at least one power station generating power using a renewable energy source.

\* \* \* \* \*